United States Patent [19]

Wagener

[11] 4,392,994
[45] Jul. 12, 1983

[54] CORROSION INHIBITOR FOR CELLULOSIC INSULATION

[75] Inventor: Anthony P. Wagener, Park Forest, Ill.

[73] Assignee: The Sherwin-Williams Company, Cleveland, Ohio

[21] Appl. No.: 202,031

[22] Filed: Oct. 29, 1980

[51] Int. Cl.³ .......................... C09K 3/00; C23F 11/00
[52] U.S. Cl. ..................................... 252/602; 252/387; 252/607; 252/389 A; 106/18.15
[58] Field of Search .................. 252/602, 607, 387

[56] References Cited

U.S. PATENT DOCUMENTS

| | | | |
|---|---|---|---|
| 4,101,441 | 7/1978 | Hwa et al. | 252/387 |
| 4,184,969 | 1/1980 | Bhat | 256/607 |
| 4,212,675 | 7/1980 | Robinson | 252/607 |
| 4,217,216 | 8/1980 | Lipinski | 252/387 |
| 4,224,169 | 9/1980 | Retana | 252/607 |
| 4,237,090 | 12/1980 | DeMonbrun et al. | 252/387 |
| 4,301,025 | 11/1981 | Brady et al. | 252/389 A |

FOREIGN PATENT DOCUMENTS

| | | | |
|---|---|---|---|
| 55-25665 | 2/1980 | Japan . | |
| 99227 | 11/1961 | Norway | 252/387 |
| 1007927 | 10/1965 | United Kingdom | 252/387 |

Primary Examiner—Benjamin R. Padgett
Assistant Examiner—M. Moskowitz
Attorney, Agent, or Firm—Robert E. McDonald; James V. Tura

[57] ABSTRACT

This invention relates to a process for limiting the corrosive nature of cellulosic insulation which has been treated with a fire-retardant composition, by applying to the insulation an effective amount of an aqueous corrosion inhibiting solution. The corrosion inhibiting solution comprises an amine or alkali metal salt of an aromatic triazole, and an amine or alkali metal salt of an organic phosphate ester acid.

11 Claims, No Drawings

CORROSION INHIBITOR FOR CELLULOSIC INSULATION

FIELD OF THE INVENTION

This invention relates to an insulating material which has improved fire-retardant and corrosion inhibiting characteristics, and a process for preparing same.

BACKGROUND

The use of cellulosic materials as insulation has been well known for many years. Cellulosic insulation is a very attractive product for many reasons. It is one of the best insulating materials available, having a very high R value. It uses as a raw material a product which is normally a waste material, used newsprint, and upgrades it to fill an important need in society. Cellulosic insulation is readily adaptable to refit applications in existing structures and for blowing into attics in both new and existing buildings. When correctly made and treated, cellulosic insulation is one of the safest types of insulating materials, and actually provides fire protection.

Cellulosic insulation is typically treated with boron compounds, specifically boric acid and borax combinations to impart fire retardancy. In order to meet current flammability specifications, and to offset the high prices and limited supply of boron compounds, other salts, especially salts involving nitrogen, phosphorous or aluminum, such as ammonium sulphate, aluminum sulphate, aluminum hydrate, ammonium phosphate, sodium tripolyphosphate and others are used as partial or total replacements for the boric acid, borax combinations. Although these salts provide satisfactory fire retardancy, they are generally corrosive to steel, copper, and aluminum. Since the cellulosic insulation is typically used in attics, walls, and other areas where it will come in contact with pipes, conduits, and other metal surfaces, the corrosive nature of these salts is a serious drawback to the use of cellulosic insulation.

The invention taught herein, overcomes the limitations of the prior art by treating the cellulosic insulation with an effective amount of special corrosion inhibiting materials.

SUMMARY OF THE INVENTION

This invention teaches a novel insulating material having fire-retardant and corrosion inhibiting characteristics wherein the insulating material comprises: (a) about 50 to 100 parts cellulosic insulation; (b) about 5 to 40 parts fire-retardant; (c) about 0.1 to about 5 parts of a corrosion inhibitor combination wherein said combination comprises (i) about 0.01 to about 10 parts of at least one amine or alkali metal salt of a triazole; and (ii) about 1.0 to about 99 parts of at least one amine or alkali metal salt of an organic phosphate ester acid. As used herein, the term parts means parts by weight.

This invention also teaches a process for limiting the corrosive nature of cellulosic insulation which has been treated with a fire-retardant composition, by applying to the insulation an effective amount of an aqueous corrosion inhibiting solution which comprises: (a) about 1.0 to about 99 parts water; (b) about 0.01 to about 10 parts of at least one amine or alkali metal salt of an aromatic triazole; and (c) about 1 to about 99 parts of at least one amine or alkali metal salt of an organic phosphate ester acid.

Since the corrosion inhibiting solution involved in this invention is an aqueous solution, it can be easily diluted with water to any viscosity level necessary for easy application to the insulation. The aqueous solution can be conveniently applied to the insulation before, after, or simultaneously with the fire-retardant compounds. As used herein, the term effective amount means a sufficient quantity of the aqueous corrosion inhibiting solution to compensate for the corrosive nature of the fire-retardant composition. Although this amount will vary depending upon the concentration of the aqueous solution, it will typically be a quantity sufficient to provide between about 0.05 percent to about 5 percent by weight on a solids basis compared to the amount of cellulosic insulation. It is generally preferred to spray the aqueous solution onto the insulation but other application methods are useable.

If desired, other materials can be used in conjunction with the aqueous solution of the alkali metal or amine salts of the triazole and organic phosphate ester acid. For instance, it is sometimes desirable to add additional water soluble or water dispersable corrosion inhibitors to the aqueous solution. Typically, up to about 65 parts of these additional corrosion inhibitors could be used. Representative examples of these known water soluble or water dispersable corrosion inhibitors include, sodium nitrite; amine or alkali metal salts of fatty acids such as tall oil fatty acid, linseed oil fatty acid, linoleic acid, oleic acid, etc.; amine or alkali metal salts of organic acids such as benzoic acid, adipic acid, phthalic anhydride, and so on.

In addition, wetting or dispersing agents are sometimes useful as additives to the aqueous solution. In particular, the use of a water soluble chelating agent, such as the sodium salt of EDTA, will insure a clear aqueous solution at almost any dilution level.

The fire-retardants useful in the practice of this invention are well known in the art. Typically, about 50 to 100 parts of cellulosic insulation would be treated with about 5 to 40 parts fire-retardant. The preferred fire-retardants are aluminum and ammonium salts, especially when combined with boric acid and borax. These salts can be combined with the boric acid and borax in almost any ratio, but it is generally preferred to have up to about 50 percent boric acid and borax in the fire-retardant combination.

The aromatic triazoles useful in this invention are those having the following structure:

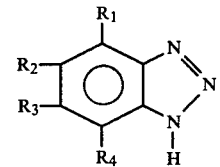

wherein $R_1$, $R_2$, $R_3$ and $R_4$ can be the same or different and each is hydrogen, nitro, alkyl, alkoxy, aroxy, carboxy, halogen or the like. It is especially preferred to use benzotriazole or tolyltriazole since these are the triazoles most readily available.

As used herein, the term organic phosphate ester acid means an acid selected from the group of acids having the formulas:

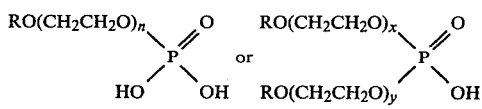

where R=alkyl from 1 to about 20 carbons or alkylaryl from 7 to about 30 carbons, or aryl, n=is an integer from 1 to 50, x=integer from 1 to 50 and y=is an integer from 1 to 50. These compounds are free acids containing ethylene oxide adducts as ester groups. These materials are commercially manufactured by a number of suppliers. A representative example is the line marketed under the trade name GAFAC$^R$ by the G.A.F. Corporation. Especially preferred in the practice of this invention is GAFAC RA-600.

The alkali metal salt of the acid or the triazole can be made by merely mixing the acid or triazole with an alkali metal base such as sodium hydroxide. If desired, the rate of formation of the salt can be increased by heating the reactants up to about 100° C. Similarily, the amine salts of the triazoles or acids can be conviently manufactured by merely mixing the triazole or acid with an amine. The reaction mixture can be heated up to about 100° C. or more, to increase the rate of salt formation. Although any amine can be used in the production of these salts, it is especially preferred to use alkanol amines due to their water solubility. The best solubility and corrosion resistance is obtained when enough amine or alkali metal base is added to give the aqueous solution a pH higher than 7.0.

It is an object of this invention to provide an insulating material having improved characteristics of fire-retardancy and corrosion inhabition. It is a further object of this invention to minimize the corrosion of metal surfaces which are in contact with insulating materials. Another object of this invention is to provide a process for limiting the corrosive nature of insulation which has been treated with a fire-retardant composition. Another object of this invention is to improve the adhesion of fire-retardant salts to insulation materials. These and other objects of this invention will be apparent from the following description.

DESCRIPTION OF THE PREFERRED EMBODIMENTS

In the following examples, unless otherwise stated, parts means parts by weight.

EXAMPLE 1

A reaction vessel equipped with a stirring apparatus, heating mantle, and thermometer was charged with 2.0 parts of tolyltriazole and 25.5 parts of GAFAC$^R$ RA-600 (organic phosphate ester acid manufactured by G.A.F. Corporation). These materials were heated to about 95° C. for a period of about 15 minutes yielding a clear solution. 20.0 parts of 85 percent grade triethanolamine was added slowly to the reaction mixture and maintained at about 95° C. for an additional fifteen minute period. Additional triethanolamine was added until the pH of 10 percent aqueous solution of the reaction mixture was adjusted to about 7.8. 2.0 parts of the sodium salt of ethylenediaminetetraacetic acid, and 50.0 parts water were then added to the reaction mixture and stirred until uniform. The corrosion inhibiting composition was a clear, yellow oily liquid having a specific gravity of about 1.08 and a pH of about 8.2.

About one part of the corrosion inhibiting composition was sprayed on about 80 parts of cellulosic insulation which had been treated with about 20 parts of a fire-retardant composition which comprised 65.9 percent ammonium sulfate, 24.7 percent borax decahydrate and 9.4 percent boric acid. Two inch by two inch square coupons of steel, copper and aluminum were inserted between layers of the insulation and subjected to 14 days of humidity cabinet exposure at 120° F. as outlined in Federal Specification H H—I 515D. The results are outlined below:

| Metal* | Appearance | Perforation | Coupon Weight Loss |
|---|---|---|---|
| | Control | (Fire-Retardant Treated Cellulose No Inhibitor) | |
| Steel | Slight Corrosion Considerable Staining | None | 0.89% |
| Copper | No Corrosion Moderate Staining | None | 0.27% |
| Aluminum | No Corrosion No Staining | None | 0.00% |
| | INHIBITOR OF EXAMPLE 1 | | |
| Steel | No Corrosion Slight Staining | None | 0.58% |
| Copper | No Corrosion Trace of Staining | None | 0.04% |
| Aluminum | No Corrosion No Staining | None | 0.00% |

*All metal coupons were .003" thick.

The data clearly shows that the coupons inserted in the insulation sample treated with both the inhibitor and the fire-retardant showed significantly better appearance and less weight loss than metal coupons in contact with the same insulation treated with the fire-retardant alone.

EXAMPLE 2

A reaction vessel equipped as outlined in Example 1 was charged with 15.5 parts of GAFAC$^R$ RA-600 and 10.0 parts 85 percent grade triethanolamine. The reactants were heated to about 95° C. for a period of about 15 minutes. The reaction mixture was allowed to cool to about 70° C. and 8.0 parts by weight of COBRATEC$^R$ TT-50S (50 percent aqueous solution of the sodium salt of tolytriazole marketed by The Sherwin-Williams Company) was added and stirred until the solution was clear. The pH of the solution was adjusted with triethanolamine until the pH of a 10 percent solution was about 7.9. 2.0 parts of the sodium salt of ethylenediaminetetraacetic acid, 10.0 parts sodium nitrite, and 54.4 parts water were added to the solution with sufficient time between each addition to allow the solutions to become uniform.

The aqueous corrosion inhibiting concentrate prepared in this example was a clear, amber-yellow, oily liquid with a specific gravity of about 1.12 and a pH of about 8.2.

About one part of this corrosion inhibiting composition was sprayed on about 80 parts of cellulosic insulation which had been treated with about 20 parts of a fire-retardant composition which comprised 40.0 percent $Al_2(SO_4)_3 \cdot 18H_2O$, 30% borax pentahydrate and 30% boric acid. Metal coupons were tested for corrosion resistance as outlined in Example 1. The results are summarized below:

| Metal | Appearance | Perforation | Coupon Weight Loss |
|---|---|---|---|
| | Control | (Fire-Retardant Treated Cellulose - No Inhibitor) | |
| Steel | Severe Corrosion Severe Staining | Extensive | 32.1% |
| Copper | Trace Corrosion Trace Staining | None | 0.64% |
| Aluminum | Trace Corrosion Trace Staining | None | 0.48% |
| | INHIBITOR OF EXAMPLE 2 | | |
| Steel | Moderate Corrosion Considerable Staining | None | 9.71% |
| Copper | No Corrosion No Staining | None | 0.01% |
| Aluminum | Trace Corrosion Trace Staining | None | 0.15% |

The resistance to corrosion in all three metals is clearly improved by the application of the aqueous inhibitor solution.

EXAMPLE 3

A reaction vessel equipped as described in Example 1 was charged with 5.0 parts GAFAC$^R$ RA-600, 20.5 parts oleic acid, and 12.0 parts by weight 85 percent grade triethanolamine and heated to about 95° C. for 15 minutes. The solution was allowed to cool to about 70° C. and then charged with 8.0 parts COBRATEC TT-50S. Additional triethanol amine was added to the concentrate to adjust the pH to about 8.1. 10.0 parts n-butanol, 2.0 parts of the sodium salt of EDTA, and 42.5 parts water were added to the concentrate in the order given with sufficient time between each addition to allow the mixture to become uniform.

The corrosion inhibiting concentrate prepared in this example was a clear, amber, oily liquid having a specific gravity of about 1.0 and a pH of about 8.3.

This solution remained stable for 3 cycles of freeze-thaw resistance tests.

About one part by weight of this corrosion inhibiting composition was sprayed on about 80 parts by weight of a cellulosic insulation which had been treated with about 20 parts by weight of a fire-retardant composition which comprised 70 percent ammonium sulfate, 20 percent borax pentahydrate and 10 percent boric acid. Metal coupons were tested for corrosion resistance as outlined in Example 1. The results are summarized below:

| Metal | Appearance | Perforation | Coupon Weight Loss |
|---|---|---|---|
| | Control | (Fire-Retardant Treated Cellulose - No Inhibitor) | |
| Steel | Slight Corrosion Considerable Staining | Some | 0.52% |
| Copper | Slight Corrosion Slight Staining | None | 0.42% |
| Aluminum | No Corrosion Trace Staining | None | 0.00% |
| | INHIBITOR OF EXAMPLE 3 | | |
| Steel | Trace Corrosion Slight Staining | None | 0.92% |
| Copper | Trace Corrosion Trace Staining | None | 0.02% |
| Aluminum | No Corrosion Slight Staining | None | 0.00% |

Resistance to corrosion is clearly improved by the use of this inhibitor.

Furthermore, in each of the examples the sample of insulation which was treated only with the fire-retardant showed considerable "dusting" caused by poor adhesion of the fire-retardants. The samples which were also treated with the aqueous corrosion inhibitor solutions showed almost no dusting.

While this invention has been described by a number of specific embodiments, it is obvious that other variations and modifications may be made without departing from the spirit and scope of the invention as set forth in the appended claims.

What is claimed is:

1. A process for limiting the corrosive nature of cellulosic insulation which has been treated with a fire-retardant composition, by applying to the insulation an effective amount of an aqueous corrosion inhibiting solution which comprises:
   (a) about 1.0 to about 99 parts water;
   (b) about 0.01 to about 10 parts of at least one amine or alkali metal salt of an aromatic triazole;
   (c) about 1 to about 99 parts of at least one amine or alkali metal salt of an organic phosphate ester acid; wherein the acid is selected from the group of acids having the formulas:

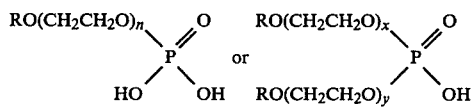

wherein R is alkyl from 1 to about 20 carbons or alkylaryl from 7 to about 30 carbons, or aryl; n is an integer from 1 to 50, x is an integer from 1 to 50 and y is an integer from 1 to 50.

2. The process of claim 1 further characterized in that the aqueous solution also contains a chelating agent.

3. The process of claim 1 further characterized in that the aqueous solution also contains up to about 65 parts of at least one additional water-soluble or water-dispersible corrosion inhibitor.

4. The process of claim 3 further characterized in that the additional corrosion inhibitor is an amine or alkali metal salt of an acid.

5. The process of claim 3 further characterized in that the additional corrosion inhibitor is sodium nitrite.

6. The process of claim 1 further characterized in that up to about 50% of the fire-retardant composition is boric acid and borax.

7. The process of claim 1 further characterized in that the aromatic triazole is benzotriazole.

8. The process of claim 1 further characterized in that the triazole is a methyl-substituted benzotriazole.

9. The process of claim 1 further characterized in that the amine is an alkanolamine.

10. An insulating material having fire-retardant and corrosion inhibiting characteristics wherein said material comprises:
   (a) about 50 to 100 parts cellulose insulation;
   (b) about 5 to 40 parts fire-retardant selected from the group consisting of borax, boric acid, aluminum salts and ammonium salts;
   (c) about 0.1 to about 5 parts of a corrosion inhibitor, wherein said corrosion inhibitor comprises (i) about 0.01 to about 10 parts of at least one amine or alkali metal salt of a triazole; and (ii) about 1 to about 99 parts of at least one amine or alkali metal salt of an organic phosphate ester acid; wherein the acid is selected from the group of acids having the formulas:

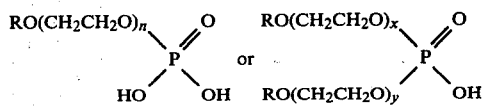

wherein R is alkyl from 1 to about 20 carbons or alkylaryl from 7 to about 30 carbons, or aryl; n is an integer from 1 to 50, x is an integer from 1 to 50 and y is an integer from 1 to 50.

11. The insulating material of claim 10 further characterized in that the corrosion inhibitor was applied as an aqueous solution.

* * * * *